UNITED STATES PATENT OFFICE.

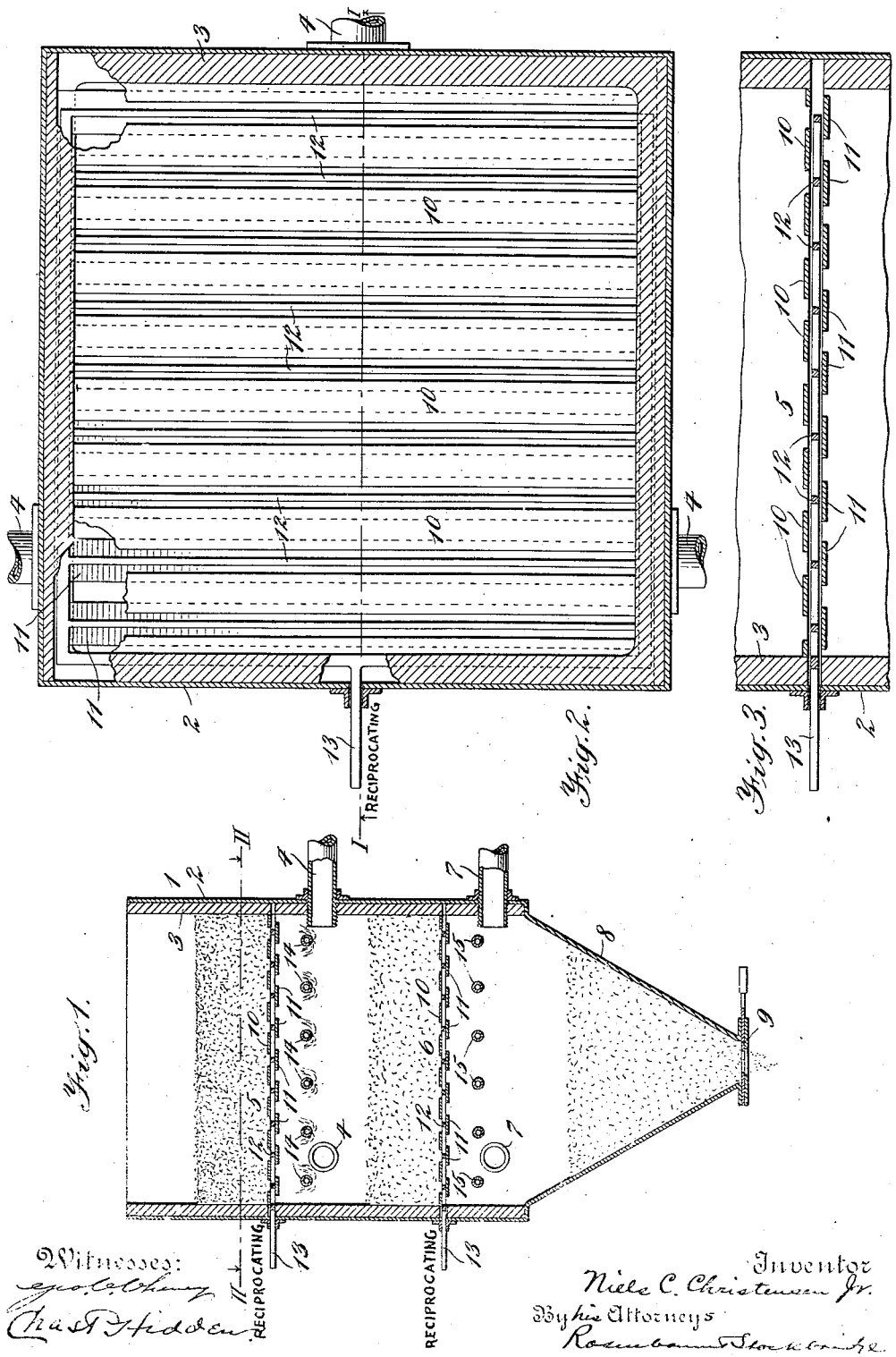

NIELS C. CHRISTENSEN, JR., OF SALT LAKE CITY, UTAH.

METHOD OF TREATING ORES AND THE LIKE.

1,058,034.  Specification of Letters Patent.  Patented Apr. 8, 1913.

Application filed March 1, 1912. Serial No. 680,836.

*To all whom it may concern:*

Be it known that I, NIELS C. CHRISTENSEN, Jr., a citizen of the United States, residing at Salt Lake City, in the county of Salt Lake and State of Utah, have invented certain new and useful Improvements in Methods of Treating Ores and the Like, of which the following is a full, clear, and exact description.

This invention relates to a novel method of treating ores or other metal bearing material, or minerals, to extract, or to prepare for the subsequent extraction of metals or elements therefrom, and in its broadest aspects is applicable to either oxidizing, reducing, chloridizing or sulfatizing processes, or to combinations of these; or for volatilizing metals or elements present in such materials. The method is more particularly intended for use in treating low grade ores containing the rarer metals such as gold, silver, copper, nickel, cobalt; but is economically applicable in many cases for treating the ores of arsenic, lead, zinc and other baser metals; so that I do not desire to be limited to any particular metal or metals; nor to the grade of the ores or material treated.

The invention contemplates the heating and cooling of ores and the like in such manner that the duration of the treatment and indeed of the successive steps thereof may be determined to a nicety, while the character of the atmosphere or gaseous medium with which the substance or substances treated are in contact, during such successive steps, together with the temperatures of the successive operations, may also be accurately determined. Thus, by way of illustration, it is possible by means of the herein described method and apparatus to heat a mass of ore to be treated at substantially a given temperature and under determined atmospheric conditions, and thereafter to cool said mass down to a given lower temperature in the presence of an atmosphere having different characteristics from that to which the mass was first subjected; the temperature, atmospheres and duration of the successive steps being under the positive control, if desired, of the operator.

My method further aims at securing a very high heat efficiency with substantially a minimum consumption of fuel, by conserving much of the heat energy heretofore wasted or lost in the ores and gases discharged from ore treating apparatus.

My invention, further, contemplates the treatment of ore with various reagents to prepare it for leaching out with suitable solvents or reagents, or otherwise obtaining therefrom, the metal values contained therein; or to reduce the metal or metals to the metallic state before concentration with suitable apparatus; or to volatilize certain metals, elements, or compounds preparatory to collecting them for subsequent treatment, or for use in leaching the ores.

These and other objects of my invention will be hereinafter referred to and the steps of the novel process whereby they may be attained will be more particularly set forth in the claims appended hereto.

In the drawings which form a part hereof and in which like reference characters designate like parts throughout the several views, I have exemplified a preferred form of apparatus wherein my novel process may be effectuated. It will be understood, however, that the herein described apparatus is but one of many which may be used; and I do not desire to be limited thereto in any way.

I am also aware that various changes and modifications may be made in my process without departing from the spirit of my invention, and I accordingly wish to be limited only by the scope of the said appended claims.

Referring to the drawings: Figure 1 is a vertical section of what I term a two-stage furnace; the section being taken on line I—I of Fig. 2. Fig. 2 is a transverse horizontal section of said furnace, drawn to a larger scale, the section being taken on line II—II of Fig. 1; portions of the grating shown being broken away for purposes of illustration. Fig. 3 is a fragmentary detail section of said grating.

The shaft 1 of the furnace preferably consists of an outer casing 2 and a lining 3, the latter of suitable refractory material, said shaft being of any desired cross-section; square being preferred. A set of pipes 4, of which there are three in the present case, may be used for introducing fuel, steam, air or hot gases, etc., into the shaft, between an upper grate, broadly designated 5 and a lower grate, similarly designated 6; while a second set of pipes 7, disposed below the lower grate 6, may be used for introducing relatively cold air or fuel gas, etc., if desired. Below the shaft is a hopper 8 provided with a discharge gate 9, whereby the treated ore or metalliferous matter, which accumulates in the hopper may be discharged at the desired rate.

The grates 5 and 6 above referred to, are of any suitable material, and may be of substantially identical construction. They should preferably be adapted to feed the ore, or other material being treated, therethrough at a relatively determined rate. In the furnace shown, each of said grates comprises an upper grating 10, preferably consisting of a series of spaced, flat bars; a lower grating 11, of similar construction, but with the spaces between the bars staggered with respect to those between the bars of grating 10; and an intermediate shifting grating 12. The disposition and action of these parts is such that ore which falls toward the grating 10, partially penetrates the interstices or spaces between the bars thereof, and accordingly is supported partly upon said bars and partly upon the bars of the lower grating 11. When the intermediate grating is reciprocated, this ore feeds down by gravity through the grate, regarded as a whole; the cross-members of the intermediate grating pushing ore laterally off from the bars of grating 11, first in one direction and then in the other. As the grating 12 is preferably moved continuously, slowly or rapidly, to and fro, the ore feeds through slowly or rapidly, as the case may be; and the rate or rates at which it passes through the grates 5 and 6 may hence be quite accurately determined, and, indeed, somewhat independently in each case, if desired.

The gratings 12 are each provided with a projection 13 by means of which they may be reciprocated; such reciprocation preferably being accomplished by means of suitable mechanism; which latter of course forms no part of the herein described process, and therefore need not be further considered. It should be noted, however, that the grate construction shown is adapted to feed ore therethrough quite uniformly over the entire surface of the grate; the ore being prevented from caking in any suitable manner.

The furnace may be heated in various ways, for example, as by means of fuel gas of any suitable description such as carbon monoxid or oil gas; and I have shown a series of fuel gas pipes or burners 14 disposed at intervals across the shaft preferably between the grates 5 and 6. If desired a second set of burners 15 may be provided below the second stage. When in use, the jets of fuel gas emerge downwardly from these pipes and spurt laterally and then upwardly toward the respective grate or grates. It will be understood, however, that the source or kind of fuel is immaterial in so far as the process in its broadest aspects is concerned. Some of the pipes 14 or 15 may also be used to introduce steam or other reagents as required; or such reagents may be introduced through the air pipes 4 or 7.

The process may be carried out as follows: Assuming that ore is the material to be treated, it is crushed to a suitable size, varying from, let us say, one half inch to a relatively fine powder. This crushed or relatively finely divided ore may then, if desired, be mixed with suitable reagents for chloridizing, etc., or with material to cause the finer ore to cake somewhat. If the ore is to be chloridized, common salt and pyrite for example, may be mixed with it; or if it is to be sulfatized, sodium sulfate and pyrite, or iron sulfate, may be used. Lime will aid in caking the finer ore and dust, but this substance is used merely as a binder, whereas common salt and sodium sulfate, for example, are usable not only in forming the conglomerate and to prevent dusting; but further may be of use chemically in the process, as above indicated. The crushed ore, or the mixture of ore and reagents may be moistened with enough water (preferably varying from 5 to 15 per cent., depending on the nature of the ore) to cause the finer ore to form small lumps when dried and thus give an open charge and lessen the dusting when charged dry; or to give a permeable charge and prevent dusting when wet. The ore is then dried or not as the case may be, the advantage of drying being that possibly three or four times as much dried material may be handled to advantage in a furnace in a given period as when such material has not been so treated. It is, however, inadvisable to dry in all cases since a certain amount of moisture prevents dusting. Whether the ore should be dried or not, therefore depends upon its condition. The ore, preferably screened, is then fed into the shaft of the furnace from the top, and finds temporary lodgment upon the upper grate 5. It is however gradually passed through this grate at a rate to be determined by the operator, and falls down onto the second stage or grate 6; from whence it is gradually passed into the hopper 8. The downward flow of the ore through grates 5 and 6 may be different in certain cases; and thus ore may be accumulated to some extent on the second stage or grating; or, vice versa, the second stage may have but a small quantity of ore under treatment thereon compared to that undergoing treatment on the upper grating. When the hopper has been filled or partially filled it may be emptied or partially emptied through the gate 9; or the ore passing into the hopper may be continuously removed therefrom. The ore, further, may be passed through one or the other of the grates, or both, either continuously or intermittently. It is usually preferable, however, to operate continuously; and to feed at equal rates through the respective grates. Assuming now that a layer of ore of proper thickness has been deposited on the upper grating and that said ore is to be heated and cooled entirely in an oxidizing atmosphere; the process may be effectuated in either of the following ways:

(1). Hot air may be supplied through the pipes 4 until the ore upon the upper grate or stage is heated to a determined temperature, effecting the oxidation of matters or substances in said ores. This treated ore is then fed continuously, if desired, through said grate, and falls upon the second grate or upon the mass of ore collected thereupon. Assuming, now that after the accumulation of a layer of hot ore of proper thickness upon the second stage has been effected, the ore is delivered through the apparatus continually, at the same rate past each grate. The hot air blast may then be shut off, or partly shut off, as the case may be, and cold air is forced or drawn through the pipes 7; which air passing up, as it must, through the oxidized and still highly heated bed or layer of loose ore upon the lower grate, abstracts heat from said ore and itself becomes highly heated before it encounters the ore upon the upper stage, and this without materially reducing its content of oxygen. This procedure saves a very great percentage of the heat in the ore upon the second stage, which would otherwise be wasted, while hastening the cooling of said ore. The supply of cold air through the pipes 7, and the supply and temperature of the hot air through the pipes 4, may be so proportioned as to heat the ore upon the upper grate to the desired temperature before it falls to the second grate; and the length of time which the ore is subjected to this treatment may, of course, be properly regulated by the speed of operation of the grates; the operator varying the length of stroke and number of strokes per unit of time, as needed.

(2). If gas or oil is used instead of hot air, the process is merely changed as follows: The fuel, e. g., carbon monoxid or oil gas, or a mixture of these, is delivered through the pipes 14, and is burned in the air forced in through pipes 7, said air being in excess of that required to support the combustion of the fuel. Here again, the incoming air is heated as it passes through the hot ore upon the second stage, and hence the proper oxidation of the ore upon the upper stage may be effected with great economy of fuel. The temperature may be regulated by the amount of fuel gas, for example, delivered through pipes 14, and by the air entering the lower extremity of the shaft.

The modes of effectuating my novel process, just described, are particularly applicable to such metalliferous materials as the relatively low grade Telluride ores from Cripple Creek, which after oxidation, as per the foregoing, give an extraction of from 95 to 99 per cent. upon treatment with cyanids. They are also applicable to base gold ores, such as those from Mercur, Utah, which yield from 85 to 90 per cent. by cyanid; and I may here observe that the preparation of such ores preparatory to cyaniding or other leaching process, which I accomplish in substantially one operation, requires a plurality of operations in all other processes with which I am acquainted, in order to obtain the same percentage. Thus, for example, at Cripple Creek the ore is first roasted in a reverberatory furnace, and then cooled in cylinders with water spray. The coarse gold is then removed by amalgamation and the fine gold, finally, by cyaniding. Silver-gold ores, from Tintic, Utah, for example, are preferably subjected to chloridizing in accordance with the foregoing, and I find that such ores will after treatment by my novel process, give an extraction of from 90 to 98 per cent. upon cyaniding. Similarly chloridized silver-gold-copper ores, containing values of three dollars in gold and silver with one and a half per cent. copper, upon being leached with acid solution from the roast, give an extraction of from 93 to 95 per cent. of the gold and silver, and approximately 95 per cent. of the copper. I have also chloridized sulfid ores of copper from Bingham, Utah; and Newhouse, Utah; said ores containing from one half to two and one half per cent. copper. In these cases, upon leaching with solutions containing the acid fumes from the roast, I obtained an extraction of from 95 to 99 per cent. of the copper. Nickel ores containing 2 per cent. nickel, when chloridized as per the foregoing, and leached with the acid solution as before, yield an extraction of from 80 to 95 per cent. Sulfid ores, sulfatized as per the foregoing, and subsequently leached with the acid solution, give an extraction of from 80 to 85 per cent.

Where the ore is to be heated entirely in a reducing atmosphere the process is carried out as follows:

(3). Fuel gas, for example, may be delivered through the pipes 15, and passes up through the ore upon the lower grate; while air is introduced through pipes 4, and burns a portion of the gas as it emerges from the ore upon the second stage, leaving enough, however, to maintain a reducing atmosphere in the ore upon the upper grate. The supply of air and fuel gas are so proportioned as to secure the proper temperature and reducing atmosphere. As evidencing the value of this phase of my process, which is particularly applicable to ores of copper, nickel, lead, zinc, etc., preparatory to concentration, I have found as the result of tests that certain oxidized ores of copper in sand-stone upon being reduced and concentrated give an extraction of from 65 to 75 per cent. Promising results have also been obtained in chloridizing ores of zinc, and in reducing and concentrating oxidized ores of lead, nickel, copper, etc.

If it be desired to treat the ore first in an oxidized atmosphere and then in a reducing atmosphere, the process will be effectuated as follows:

(4). Fuel gas, for example, may be introduced through the pipes 15, and air through pipes 4 and 7; the bulk of the air being delivered through pipes 7, however. The gas passes through the ore upon the lower grate and is burned principally in the air supplied between the grates or stages; and the quantities of air and gas admitted are so proportioned and regulated that the ore upon the upper grate is subjected to an oxidizing atmosphere while that on the lower grate is maintained in a reducing atmosphere. In some cases no air need be admitted through pipes 7, but only through those designated 4. By way of illustration, in this connection, I may state that sulfid ores of copper containing as low as two, to two and one-half per cent. of copper, may be made to give an extraction of from 65 to 75 per cent. of the copper upon being first oxidized and then reduced as per the foregoing, and after concentration. In general, the combined oxidation and reducing steps above referred to are adapted for use in treating the sulfid ores, not only of copper, but also of nickel, lead, zinc, etc., preparatory to concentration.

(5). If a reducing atmosphere is desired in the upper stage or step and an oxidizing atmosphere in the lower stage, air may be admitted through the lower pipes 7, and fuel gas, for example, may be introduced at the upper pipes 14, in such relative proportions and amounts that only part of the fuel gas is burned and the residue together with the products and partial products of combustion, pass up through the ore upon the upper grate, at the proper temperature.

I am of the opinion that the efficiency of the process in oxidizing is due to the very intimate contact of the heated gases with the ores; since in all other furnaces, with which I am acquainted, the gases come in contact only more or less superficially with the ores. The same holds true in the case of the reducing action, where the reducing gases when handled, together with the ore to be treated, in accordance with my novel method, are brought into very intimate contact with said ore.

The great efficiency of the process as a whole, is due not only to the intimate contact of the ore with the gaseous reagents; but to the fact that the temperature in each step of the operation may be most accurately controlled; while the matters to be treated may be subjected to such temperature for practically just the length of time which is best suited to effect the desired reaction or reactions. These desirable features and characteristics of the process are, in considerable measure, made possible by the novel way in which the ore or material treated is divided up into a plurality of preferably superposed, spaced masses. This permits of the introduction of heating or cooling agents, and chemical reagents, therebetween and into most intimate contact therewith, in the manner, for the time, and at the temperature or temperatures desired; while effecting, also, a reduction in the loss of heat to a minimum. This latter is due not only to the imparting of heat from the treated ores to the ascending relatively cool gaseous material (whether the latter be air or fuel); but further to the effecting of strong exothermic reactions directly within and throughout the mass of the already partly heated gaseous medium, and preferably while said medium is traversing the space between the upper and lower stages.

Practical tests have demonstrated the success and efficiency of this process of heating ores in stages at temperatures and for periods under the positive control of the operator, and in atmospheres adapted to the particular kinds of ores treated; and both the process and apparatus for the above named uses give promise of a wide field of application, particularly in the treatment of low grade ores. The term stages may be used to cover not alone the actual supports or gratings upon which the ore masses rest, but may also be applied to the periods or steps in the process.

While I have illustrated a two stage apparatus and process, I do not wish to be limited to such number, since it is obvious that the principle may be extended. The interrupted advance of the ore mass along its path of travel through the apparatus described may be regarded as a step-by-step motion and has been so defined in certain of the claims. Finally, I desire it to be understood that the terms gas or gaseous material, as used herein, are intended to also cover vapors and vaporous matter, and are obviously applicable to both air and oxygen; and to carbon-monoxid, oil-gas, or like combustible material.

Having described my invention, I claim:
1. The method of treating metalliferous material, which comprises establishing a general downward flow of a stream of the material to be treated by stages, accelerating the rate of flow of said material between stages, and retarding it at said stages, to provide a gap between stages, subjecting the material present in stages of different elevations to contact with gaseous reagents having markedly different temperatures, and passing the gaseous reagent surrounding some of said material in one stage on to another of said stages while introducing additional reactive matter into said last mentioned gaseous reagent.

2. The method of treating metalliferous material, which comprises establishing a movement of the material to be treated through a determined path at alternately relatively slow and rapid rates, subjecting the material disposed at different portions of said path to contact with gaseous matters having markedly different temperatures, and passing the gaseous matter surrounding some of said metalliferous material disposed at one point in said path and which constitutes the atmosphere for said material at said point, over to another point in said path while introducing a metallurgical reagent into said last mentioned gaseous matter to form an atmosphere for the metalliferous material at said second point, said last mentioned atmosphere having different characteristics from those of said first mentioned atmosphere.

3. The method of treating metalliferous material which comprises establishing a variable and step by step movement of the mass of material to be treated through a determined path, subjecting the material disposed at different portions of said path to contact with gaseous matters having markedly different temperatures, and passing the gaseous matter surrounding some of said metalliferous material disposed at one point in said path and which constitutes the atmosphere for said material at said point, over to another point in said path while mechanically introducing a metallurgical reagent extraneous to said mass into said last mentioned gaseous matter to form an atmosphere for the metalliferous material at said second point, said last mentioned atmosphere having different characteristics from those of said first mentioned atmosphere.

4. The method of treating metalliferous material which comprises establishing a halting and step by step movement of a mass of material to be treated, through a determined path, subjecting the material disposed at different portions of said path to contact with different atmospheres, at markedly different temperatures, and converting one of said atmospheres into another by introducing thereinto a reagent capable of acting upon ingredients of said mass to be treated, said reagent being extraneous to said mass.

5. The method of treating metalliferous material, which comprises establishing a halting and step by step movement of a mass of material to be treated, through a determined path, subjecting the material disposed at different portions of said path to contact with different atmospheres, at markedly different temperatures, and converting one of said atmospheres into another by introducing thereinto a gaseous reagent capable of acting upon ingredients of said mass to be treated, said reagent being extraneous to said mass.

6. The method of treating ore which comprises establishing a flow of a mass of ore in stages, subjecting said ore while in one stage, and when heated, to intimate contact with gaseous matter by flowing the bulk of said matter directly through the mass of ore in said stage and imparting heat to said matter from said ore, and thereafter subjecting another quantity of said ore, while in a stage prior to that above referred to, to contact with the so heated gaseous matter.

7. The method of treating ore which comprises establishing a flow of a mass of ore in stages, subjecting said ore while in one stage, and when heated, to intimate contact with relatively cool gaseous matter by flowing the bulk of said matter directly through the mass of ore in said stage and imparting heat to said matter from said ore, adding a metallurgical reagent to the so heated gaseous matter, and subjecting another quantity of said ore, while in a stage prior to that above referred to, to contact with said reagent and said gaseous matter.

8. The method of treating ore which comprises establishing a flow of ore in stages, while subjecting said ore in different stages to the action of gaseous materials, one of said materials being free oxygen and another being a fuel, said ore in one stage, and when heated, being brought into intimate contact with one at least of said gaseous materials and caused to impart considerable heat to the latter, said intimate contact being effected by flowing the bulk of said last mentioned gaseous material directly through the mass of ore in said stage, adding a second of said gaseous materials to the so heated, first mentioned, gaseous material, and bringing another quantity of said ore, while in a stage prior to that above referred to, into intimate contact with said mixed gaseous materials.

9. The process of treating ores which comprises successively subjecting the ore to be treated to heating and cooling actions by heating a quantity of said ore through the instrumentality of a hot gaseous medium, in a first stage, and cooling a so previously heated quantity of said ore, in a second stage, by bringing said ore into contact with a relatively cool gaseous medium and thereby partly heating the latter, said intimate contact being effected by flowing the bulk of said relatively cool gaseous medium directly through the mass of ore in said second stage, and converting the last mentioned and now partly heated gaseous medium into the hot gaseous medium aforesaid by reacting upon portions thereof with a reagent adapted to react exothermically therewith, said reagent being introduced between said stages.

10. The process of treating ores which comprises successively subjecting the ore to be treated to heating and cooling actions by heating a quantity of said ore through the instrumentality of a hot gaseous medium, and cooling a so previously heated quantity of said ore by bringing it into contact with a relatively cool gaseous medium by flowing the bulk of the latter directly through the mass of said previously heated ore, thereby partly heating said last mentioned gaseous medium, and converting said now partly heated gaseous medium into the hot gaseous medium aforesaid by reacting upon portions thereof with a reagent adapted to react exothermically therewith.

11. The process of treating ores which comprises successively subjecting the ore to be treated to heating and cooling actions by heating a quantity of said ore through the instrumentality of a hot gaseous medium in a first stage and cooling a so previously heated quantity of said ore in a second stage by bringing said ore into contact with a relatively cool gaseous medium and thereby partly heating the latter by passing the bulk of said cool gaseous medium directly through the mass of said ore in said second stage, and converting the last mentioned and now partly heated gaseous medium into the hot gaseous medium aforesaid by reacting upon portions thereof with a reagent adapted to react exothermically therewith, said reagent being introduced between said stages, said hot gaseous medium adapted to provide an oxidizing atmosphere for said ore in the first stage.

12. The process of treating ores which comprises successively subjecting the ore to be treated to heating and cooling actions by heating a quantity of said ore through the instrumentality of a hot gaseous medium in a first stage and materially cooling a so previously heated quantity of said ore in a second stage by bringing said ore into contact with a relatively cool gaseous medium, thereby partly heating the latter, and converting the last mentioned and now partly heated gaseous medium into the hot gaseous medium aforesaid by reacting upon portions thereof with a reagent adapted to react exothermically therewith, said reagent being introduced between said stages, said hot gaseous medium adapted to provide an oxidizing atmosphere for said ore in the first stage, and said relatively cool gaseous medium adapted to provide a reducing atmosphere for said ore in said second stage.

13. The process of treating ores which comprises successively subjecting the ore to be treated to heating and cooling actions by heating a quantity of said ore through the instrumentality of a hot gaseous medium, in a first stage, and cooling to a marked extent a so previously heated quantity of said ore in a second stage, by bringing said ore into contact with a relatively cool gaseous medium and thereby partly heating the latter, and converting the last mentioned and now partly heated gaseous medium into the hot gaseous medium aforesaid by reacting upon portions thereof with a reagent adapted to react exothermically therewith, said reagent being introduced between said stages, said relatively cool gaseous medium adapted to provide a reducing atmosphere for said ore in said second stage.

14. The process of treating ores which comprises successively subjecting the ore to be treated to heating and cooling actions by heating a quantity of said ore through the instrumentality of a hot gaseous medium, in a first stage, and materially cooling a so previously heated quantity of said ore, in a second stage, by bringing it into contact with a relatively cool gaseous medium and thereby partly heating the latter by passing the bulk of said cool gaseous medium directly through the mass of said ore in said second stage, and converting the last mentioned and now partly heated gaseous medium into the hot gaseous medium aforesaid by reacting upon portions thereof with a reagent adapted to react exothermically therewith, said reagent being introduced between said stages, one of said gaseous mediums being adapted to provide an oxidizing atmosphere for the ore in one of said stages.

15. The process of treating ores which comprises successively subjecting the ore to be treated to heating and cooling actions by heating a quantity of said ore through the instrumentality of a hot gaseous medium, in a first stage, and materially lowering the temperature of a so previously heated quantity of said ore, in a second stage, by bringing said ore into contact with a relatively cool gaseous medium and thereby partly heating the latter by passing the bulk of said cool gaseous medium directly through the mass of said ore in said second stage, and converting the last mentioned and now partly heated gaseous medium into the hot gaseous medium aforesaid by reacting upon portions thereof with a reagent adapted to react exothermically therewith, said reagent being introduced between said stages, one of said gaseous mediums being adapted to provide a reducing atmosphere for the ore in one of said stages.

16. The process of treating ores which comprises successively subjecting the ore to be treated to heating and cooling actions by heating a quantity of said ore through the instrumentality of a hot gaseous medium, in a first stage, and materially cooling a so previously heated quantity of said ore, in a second stage, by bringing said ore into contact with a relatively cool gaseous medium and thereby partly heating the latter by passing the bulk of said cool gaseous medium directly through the mass of said ore in said second stage, and converting the last mentioned and now partly heated gaseous medium into the hot gaseous medium aforesaid by reacting upon portions thereof with a reagent adapted to react exorthermically therewith, said reagent being introduced between said stages, one of said gaseous mediums being adapted to provide an oxidizing atmosphere for the ore in one of said stages, and the other of said gaseous mediums being adapted to provide a reducing atmosphere for the ore in the other of said stages.

17. The process of treating ores which comprises subjecting ore to a heating atmosphere in a heating stage, and thereafter subjecting said ore to a cooling atmosphere in a cooling stage, the latter by passing relatively cool gas directly through and in contact with the ore in the cooling stage, thereby also partly heating said last mentioned gas, flowing the so partly heated gas toward the ore in said first stage, and further heating said gas by effecting exothermic reactions in the mass thereof during its passage between stages, whereby to form the heating atmosphere aforesaid.

18. The process of treating ores which comprises successively subjecting the ore to be treated to heating and cooling actions by heating a quantity of said ore through the instrumentality of a hot gaseous medium, in a first stage, and materially cooling a so previously heated quantity of said ore, in a second stage, by bringing said ore into contact with a relatively cool gaseous medium and thereby partly heating the latter by passing the bulk of said cool gaseous medium directly through the mass of said ore in said second stage and converting the last mentioned and now partly heated gaseous medium into the hot gaseous medium aforesaid by introducing a heat yielding metallurgical reagent thereinto, said reagent being introduced between said stages.

19. The process of treating ores which comprises successively subjecting the ore to be treated to heating and cooling actions by heating a quantity of said ore through the instrumentality of a hot gaseous medium, in a first stage, and materially cooling a so previously heated quantity of said ore, in a second stage, by bringing it into contact with a relatively cool gaseous medium and thereby partly heating the latter by passing the bulk of said cool gaseous medium directly through the mass of said ore in said second stage, and converting the last mentioned and now partly heated gaseous medium into the hot gaseous medium aforesaid by introducing a heat yielding metallurgical reagent thereinto, said reagent being introduced, between said stages, one of said gaseous mediums being adapted to provide an oxidizing atmosphere for the ore in one of said stages.

In witness whereof, I subscribe my signature, in the presence of two witnesses.

NIELS C. CHRISTENSEN, Jr.

Witnesses:
 CHAS. P. HIDDEN,
 WALDO M. CHAPIN.